(12) United States Patent
Fang et al.

(10) Patent No.: US 12,079,402 B2
(45) Date of Patent: Sep. 3, 2024

(54) BUTTON, DISPLAY DEVICE, SHOWER CONTROL DEVICE, AND CONTROL METHOD THEREOF

(71) Applicant: XIAMEN AXENT CORPORATION LIMITED, Xiamen (CN)

(72) Inventors: Yimin Fang, Xiamen (CN); Deji Yang, Xiamen (CN); Dongsheng Yao, Xiamen (CN)

(73) Assignee: XIAMEN AXENT CORPORATION LIMITED, Fujian (CN)

( * ) Notice: Subject to any disclaimer, the term of this patent is extended or adjusted under 35 U.S.C. 154(b) by 0 days.

(21) Appl. No.: 17/802,919

(22) PCT Filed: Nov. 15, 2021

(86) PCT No.: PCT/CN2021/130577
§ 371 (c)(1),
(2) Date: Aug. 26, 2022

(87) PCT Pub. No.: WO2022/063339
PCT Pub. Date: Mar. 31, 2022

(65) Prior Publication Data
US 2023/0085984 A1 Mar. 23, 2023

(30) Foreign Application Priority Data
Sep. 25, 2020 (CN) .......................... 202011022420.1

(51) Int. Cl.
*G06F 3/0362* (2013.01)
*F16K 37/00* (2006.01)
*G06F 3/04817* (2022.01)

(52) U.S. Cl.
CPC ........ *G06F 3/0362* (2013.01); *F16K 37/0091* (2013.01); *G06F 3/04817* (2013.01)

(58) Field of Classification Search
CPC ... G06F 3/0362; G06F 3/04817; G09F 9/3023
See application file for complete search history.

(56) References Cited

U.S. PATENT DOCUMENTS 3,924,227 A * 12/1975 Stolov ............... G02F 1/133621
40/448
4,194,352 A * 3/1980 Terzian .................... G04G 9/08
368/239

(Continued)

FOREIGN PATENT DOCUMENTS

CN 101557960 A 10/2009
CN 102122497 A 7/2011

(Continued)

OTHER PUBLICATIONS

International Search Report and Written Opinion for PCT/CN2021/130577; dated Apr. 20, 2022; 11 pages including English translation of Search Report.

*Primary Examiner* — Amy Onyekaba
(74) *Attorney, Agent, or Firm* — Schwabe, Williamson & Wyatt, P.C.

(57) ABSTRACT

Provided are a button, a display device, a shower control device and a control method thereof. The display device displays a first parameter represented by a number and comprises seven display sections that form a rectangular divided by horizontal bars to display characters. The seven display sections are horizontally arranged display sections a, g, d from top to bottom, respectively, and are vertically arranged display sections f, b, e, c respectively, wherein the display sections f, b, e, c are arranged at the upper left, upper right, lower left and lower right of the display section g, respectively. The display device is further used for displaying a second parameter represented by a progress bar.

16 Claims, 5 Drawing Sheets

(56) References Cited

U.S. PATENT DOCUMENTS

| | | | | |
|---|---|---|---|---|
| 4,270,196 A * | 5/1981 | Terzian | G04G 9/08 | 368/239 |
| 4,918,428 A * | 4/1990 | Bebel | G09F 9/302 | 345/50 |
| 6,408,988 B2 * | 6/2002 | Hani | G09F 9/302 | 187/391 |
| 10,663,075 B2 * | 5/2020 | Wang | E03C 1/055 | |
| 2006/0119542 A1 * | 6/2006 | Ho | G09F 9/33 | 345/34 |
| 2006/0207133 A1 * | 9/2006 | Tsutsumi | G09F 9/302 | 40/451 |
| 2006/0212240 A1 * | 9/2006 | Fujita | G01J 1/10 | 702/68 |
| 2006/0290374 A1 * | 12/2006 | Fisher | G09F 9/302 | 257/84 |
| 2009/0217712 A1 * | 9/2009 | Kim | D06F 34/34 | 68/12.27 |
| 2010/0060442 A1 * | 3/2010 | Hirano | F01N 11/00 | 340/438 |
| 2010/0218565 A1 * | 9/2010 | Wan | G09F 9/33 | 362/97.1 |
| 2012/0098735 A1 * | 4/2012 | Wu | G09F 9/302 | 345/33 |
| 2014/0111992 A1 * | 4/2014 | Yeoh | H01L 25/0753 | 257/E33.059 |
| 2014/0144395 A1 * | 5/2014 | Blessing | F24H 15/174 | 122/19.2 |
| 2015/0083253 A1 * | 3/2015 | Menolotto | F16K 37/0008 | 137/597 |
| 2016/0378322 A1 * | 12/2016 | Klicpera | G06F 3/0362 | 715/773 |
| 2017/0153718 A1 * | 6/2017 | Brown | B60K 37/06 | |
| 2018/0154774 A1 * | 6/2018 | Park | G06F 3/04847 | |
| 2018/0308398 A1 * | 10/2018 | Kaoh | G09F 13/22 | |
| 2018/0340624 A1 * | 11/2018 | Wang | E03C 1/055 | |
| 2019/0228687 A1 * | 7/2019 | Smith | G09F 9/33 | |
| 2021/0225211 A1 * | 7/2021 | Lin | G06F 1/181 | |
| 2021/0230854 A1 * | 7/2021 | Bruno | B08B 9/00 | |

FOREIGN PATENT DOCUMENTS

| | | |
|---|---|---|
| CN | 104390370 A | 3/2015 |
| CN | 213982256 U | 8/2021 |
| JP | 2017049920 A | 3/2017 |

\* cited by examiner

BUTTON, DISPLAY DEVICE, SHOWER CONTROL DEVICE, AND CONTROL METHOD THEREOF

CROSS-REFERENCE TO RELATED APPLICATION

The present application is a national phase entry under 35 U.S.C. § 371 of International Application No. PCT/CN2021/130577, filed Nov. 15, 2021, which designates the United States of America, which claims priority to CN Application No. 202011022420.1, filed Sep. 25, 2020, the entire disclosures of each of these applications are hereby incorporated by reference in their entireties and for all purposes.

FIELD

The present disclosure relates to a display device and in particular to a shower control device using the display device.

BACKGROUND

With the development of intelligent bathroom, a display screen is generally used in a bathroom equipment to display a water temperature, a flow rate, a body temperature, etc., which is more intuitive and convenient to use. Due to the diversity of functions of the bathroom equipment, it is necessary to display a variety of parameters. For example, the value of the water temperature is displayed by a seven-segment digit tube in a shape of "日", while the flow rate is displayed by a strip-shaped circle formed by an LCD screen. Therefore, in the conventional technology, the parameters such as the water temperature and the flow rate are generally displayed through two or more different display screens, which results in a cumbersome display interface, occupies design space of the bathroom equipment, and high cost of using multiple display screens.

SUMMARY

In view of this, a display device and a shower control device using the display device are provided according to the present disclosure, which can display two parameters of water temperature and flow rate with one single display screen, so that the appearance design of the shower control device is simple and the cost is reduced.

In order to achieve the above objects, the technical solution according to the present disclosure is as follows.

A display device for displaying a first parameter displayed with a certain digits, includes seven display segments forming a shape of "日", the seven display segments are laterally arranged display segments a, g and d from top to bottom, and longitudinally arranged display segments f, b, e and c, respectively, where the display segments f, b, e and c are arranged at upper left, upper right, lower left and lower right of the display segment g, respectively, the display device is further configured to display a second parameter that is displayed by a progress bar, a display segment h is laterally arranged between the display segments a and g, a display segment i is laterally arranged between display segments g and d, and the display segments a, h, g, i and d form the progress bars; or, a display segment j is longitudinally arranged between the displays segments f and b, and the display segments f, j and b form the progress bars; or, a display segment k is arranged between the display segments e and c, the display segments e, k and c form the progress bars.

Preferably, the display segments a, h, g, i and d are even spaced apart and have a same length, the display segments f, j and b are even spaced apart and have a same length, and the display segments e, k and c are even spaced apart and have a same length.

Preferably, the display segments f, j and b and the display segments e, k, and c form two groups of longitudinally distributed progress bars, and f and e, j and k, and b and c are displayed synchronously.

Preferably, the seven display segments forming the shape of "日" and the display segments h and i or the display segment j or the display segment k are arranged as two laterally parallel groups.

Preferably, an interval between the two groups of the seven display segments is the same with an interval between the display segments j and b.

A shower control device includes the above display device, the first parameter is a water temperature, and the second parameter is a flow rate.

Preferably, the shower control device further includes a control panel, a shower panel, a switch key for controlling the display device to selectively display the water temperature or the flow rate, and an adjustment assembly for controlling the water temperature and the flow rate, the switch key and the adjustment assembly are arranged in the shower panel, and the switch key, the adjustment assembly and the display device are electrically connected to the control panel, respectively.

Preferably, the adjusting assembly is a rotary knob, and the display device is arranged inside the rotary knob and is configured to display the water temperature or the flow rate on a front surface of the rotary knob, and the rotary knob is rotated to adjust the water temperature or the flow rate.

A control method of a shower control device includes the following steps:
  displaying a water temperature by the display device with a certain digits, in which the digits are formed by seven display segments forming a shape of "日"; and
  operating a switch key, so that the display device is switched to display a flow rate in a form of a progress bar, the display segments forming the progress bars includes a part of the digit display segments and additional display segments arranged laterally or longitudinally within and/or outside the digit display segments, and the display segments forming the progress bars are arranged laterally or longitudinally.

Preferably, the display device is arranged inside the rotary knob, and the water temperature or the flow rate is adjusted by rotating the rotary knob.

The beneficial effects according to the present disclosure are in that: multiple parameters can be displayed with one single display device by sharing display segments, such as displaying two parameters of the water temperature and the flow rate, which simplifies the appearance design of the shower control device and reduces the cost.

DETAILED DESCRIPTION OF THE EMBODIMENTS

In order to make the person skilled in the art have a better understanding of solutions of the present application, the present application is described in further detail hereinafter, in conjunction with the drawings.

Figure 1:
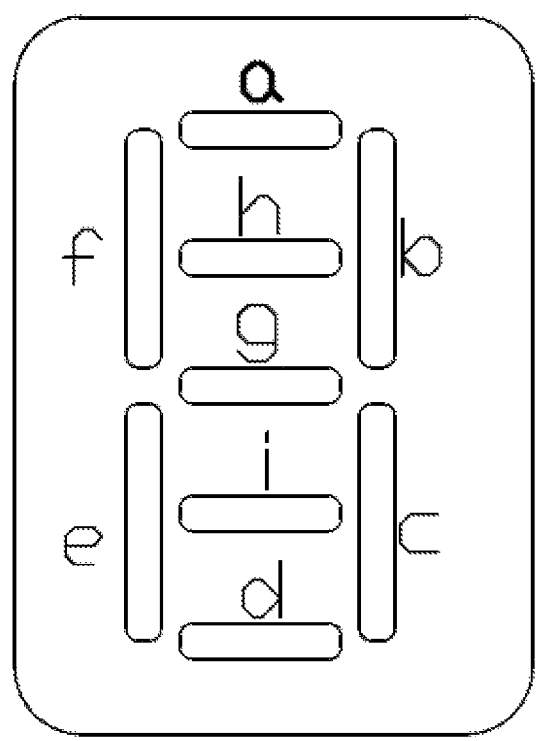
FIG. 1 is a schematic structural view of a display device according to a first embodiment of the present disclosure.
Figure 2:
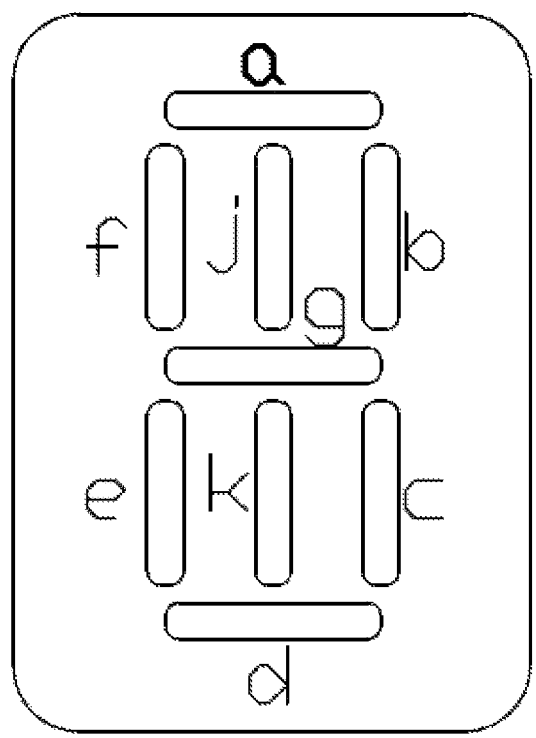
FIG. 2 is a schematic structural view of the display device according to a second embodiment of the present disclosure.

Referring to FIG. 1 and FIG. 2, the display device according to the present disclosure for displaying a first parameter that is displayed with a certain digits includes seven digit display segments forming a shape of "日", and the seven digit display segments forming the shape of "日" are respectively laterally arranged display segments including a, g and d from top to bottom, and longitudinally arranged display segments including f, b, e and c, where the display segments f, b, e and c are arranged at upper left, upper right, lower left and lower right of the display segment g, respectively.

The display device further display a second parameter which is displayed by a progress bar, at least one display segment is provided between two adjacent lateral or longitudinal display segments of the display segments in the shape of "日", and all the lateral or all the longitudinal display segments constitute the progress bars. As shown in FIG. 1, a display segment h is provided between the laterally arranged adjacent display segments a and g, a display segment i is provided between the laterally arranged adjacent display segments g and d, and the display segments a, h, g, i and d form the progress bars for displaying the second parameter. According to another embodiment, as shown in FIG. 2, a display segment j is provided between the longitudinally arranged adjacent displays segments f and b, a display segment k is provided between the longitudinally arranged adjacent display segments e and c, and the display segments f, j, b, e, k and c form the progress bars for displaying the second parameter. Two parameters can be displayed by one single display device with such arrangement. The display segments of the display device may be digit tubes.

The laterally arranged progress bars a, h, g, i and d for displaying the second parameters are even spaced apart and have a same length. In another embodiment, the longitudinally arranged progress bars f, j and b, and e, k and c for displaying the second parameter are even spaced apart and have a same length, which is more aesthetic when the second parameter is displayed.

Figure 4:
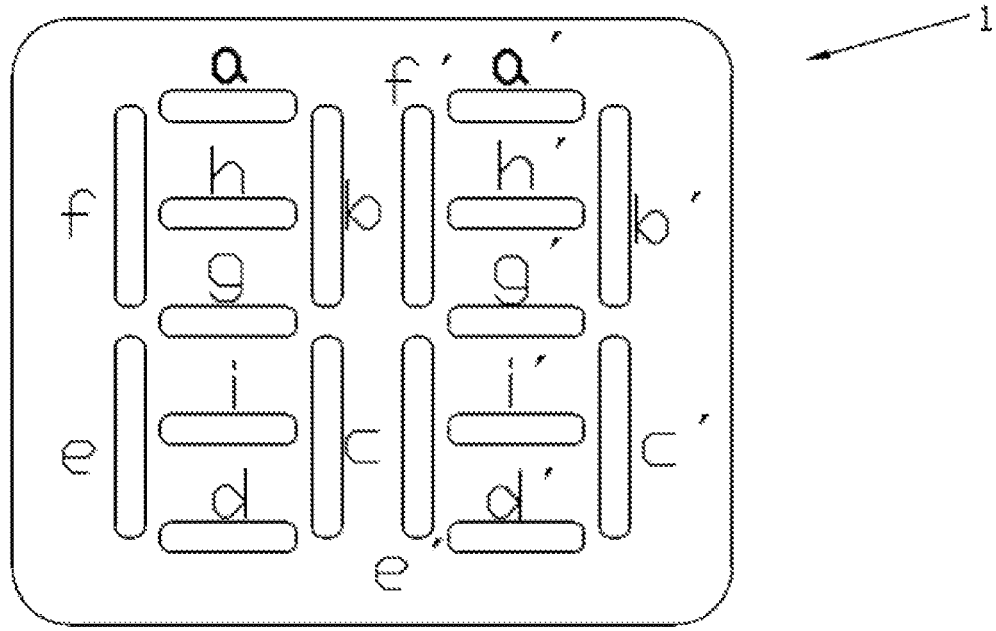
FIG. 4 is a schematic view of a display device of the shower control device according to the present disclosure.
Figure 5:
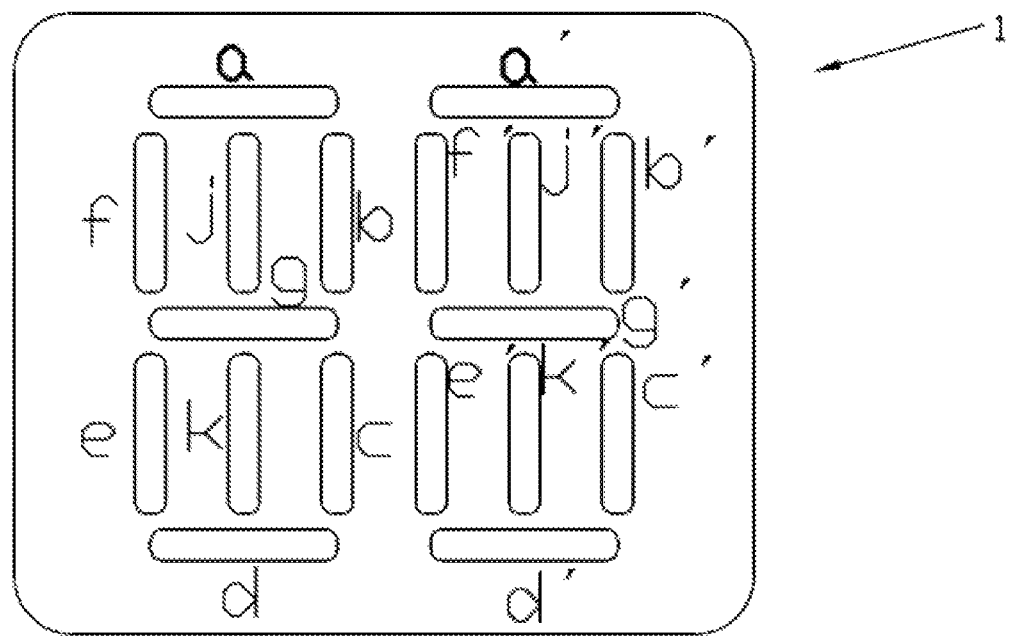
FIG. 5 is a schematic view of the display device of the shower control device according to a second embodiment of the present disclosure.

As shown in FIG. 4 and FIG. 5, the display segments are arranged into two groups. In addition, in the second embodiment, an interval between the two groups of the display segments is the same with an interval between the longitudinally arranged display segments j and b, that is, as shown in FIG. 5, the interval between the display segments j and b is the same with an interval between the display segments b and f', so that the two groups of longitudinal arranged progress bars f, j, b, f', j' and b' are even spaced apart and have a same length, and the longitudinal arranged progress bars e, k, c, e', k' and c' are even spaced apart and have a same length, which is more aesthetic when the second parameter is displayed. The display segments f and e, j and k, b and c, f' and e', j' and k', and b' and c' can be arranged to be illumined synchronously for display.

Figure 3:
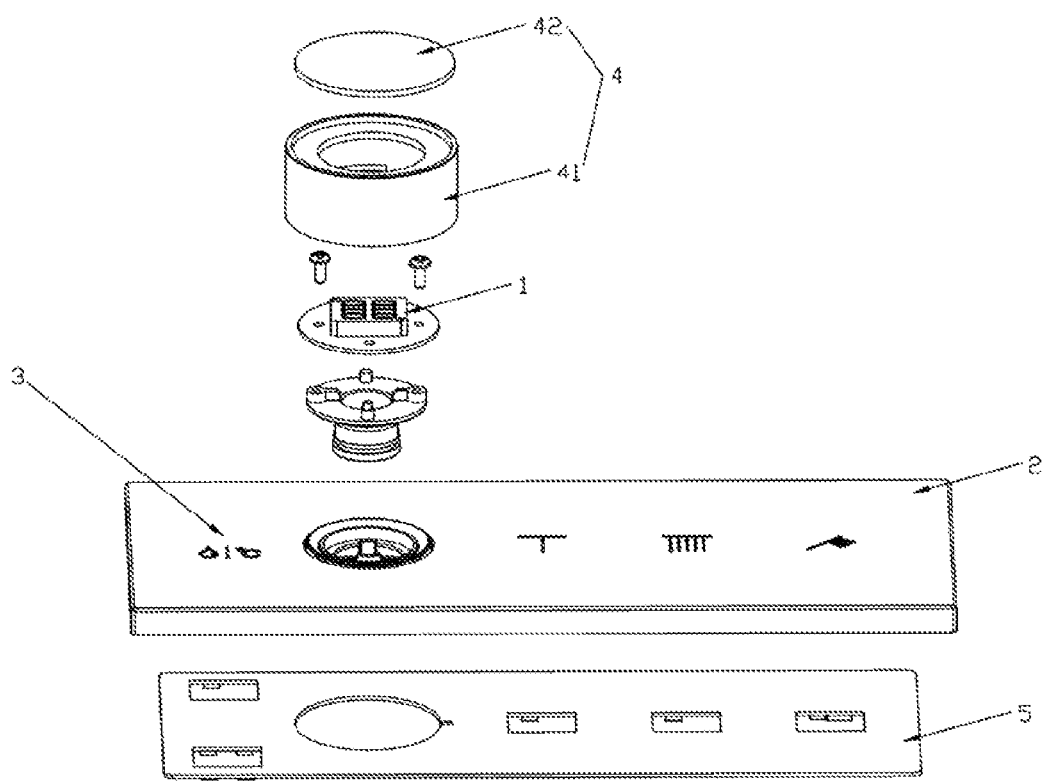
FIG. 3 is an exploded view of a shower control device according to the present disclosure.

As shown in FIG. 3, a shower control device includes the above display device 1, and further includes a shower panel 2 and a switch key 3 and an adjustment assembly 4 which are arranged on the shower panel 2. The first parameter displayed by the display device 1 with a certain digits is a water temperature. For example, the display device displays the digits 38 if the current water temperature of the shower control device is 38° C.; the second parameter, which is displayed by the display device in a manner of the progress bar, is a flow rate, and the more progress bars a, h, g, i, d, a', h', g', i' and d' are illumined, the greater the flow rate is. The switch key 3 is configured to control the display device to be switched between the water temperature and the flow rate, and the adjustment assembly 4 is configured to control the water temperature or the flow rate. In this embodiment, the adjustment assembly 4 is a rotary knob, which includes a knob casing 41 and a transparent cover 42. The display device 1 is arranged in the knob casing 41, and the water temperature or the flow rate displayed by the display device 1 can be observed through the transparent cover 42 on a front surface of the rotary knob. In this case, the rotary knob 4 is rotated clockwise to increase the water temperature or the flow rate, and the rotary knob 4 is rotated counterclockwise to decrease the water temperature or the flow rate.

The shower control device further includes a control panel 5, and the switch key 3, the adjustment rotary knob 4 and the display device 1 are electrically connected to the control panel 5, respectively.

Figure 6:
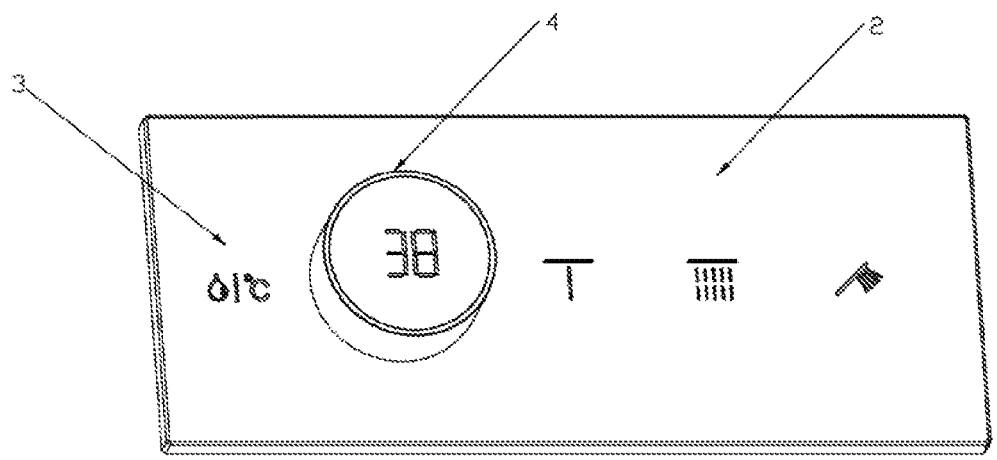
FIG. 6 is a schematic view of displaying a temperature of the shower control device according to the present disclosure.
Figure 7:
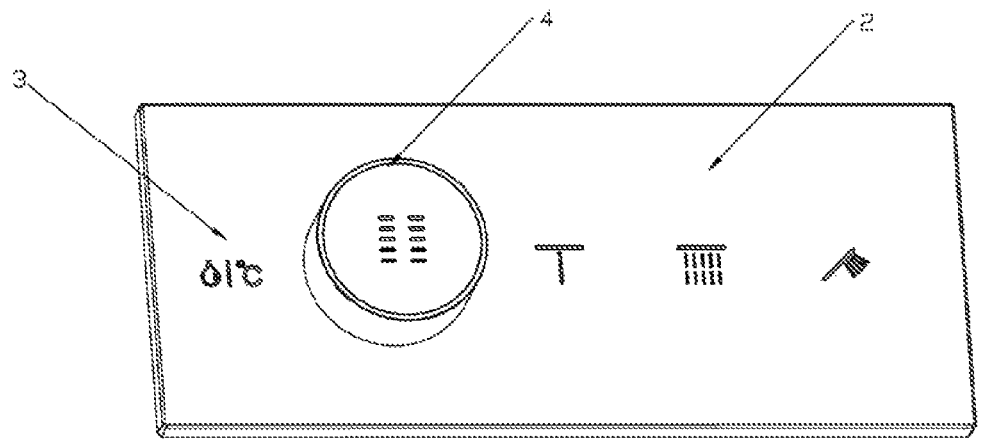
FIG. 7 is a schematic view of displaying a flow rate of the shower control device according to the present disclosure.
Figure 8:
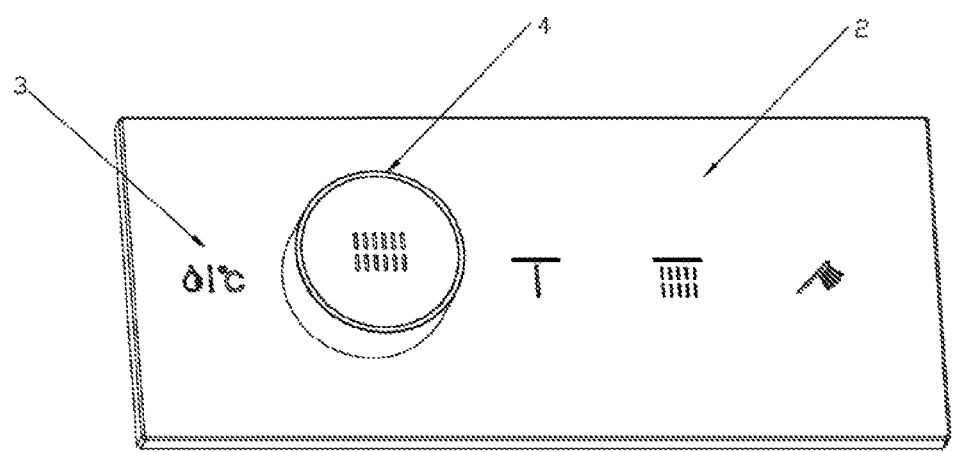
FIG. 8 is a schematic view of displaying the flow rate of the shower control device according to a second embodiment of the present disclosure.

As shown in FIG. 6, the display device 1 inside the rotary knob 4 displays the current water temperature (for example, 38) when the shower control device is powered on. Turning the rotary knob 4 clockwise can increase the water temperature, and turning the rotary knob 4 counterclockwise can reduce the water temperature. In this case, if the switch key 3 is touched, the display device 1 displays the current flow rate as shown in FIG. 7. The more progress bars a, h, g, i, d, a', h', g', i' and d' are illumined, the greater the flow rate is. In this case, turning the rotary knob 4 clockwise can increase the water flow rate, and turning the rotary knob 4 counterclockwise can decrease the water flow rate. The lighting sequence of the progress bars can be arranged from bottom to top, and then from left to right. FIG. 8 is a schematic view of showing the flow rate of the shower control device according to a second embodiment of the present disclosure. When the flow rate is adjusted, the lighting sequence of the progress bars can be arranged from left to right, and then from top to bottom. The display segments a and a', h and h', g and g', i and i', d and d' can be arranged to be illumined synchronously for display.

A control device of a shower control device is provided according to the present disclosure, which includes the following steps:

displaying a water temperature by the display device with a certain digits, and the digits are formed by seven display segments forming a shape of "日"; and operating a switch key, so that the display device is switched to display a flow rate in a form of a progress bar, the display segments forming the progress bars include a part of the seven display segments and additional intermediate display segments arranged within the seven display segments, and the display segments forming the progress bars are arranged laterally or longitudinally. The display device is preferably arranged inside the rotary knob, and the water temperature or the flow rate is adjusted by rotating the rotary knob.

Principles and embodiments of the present application are described herein through specific examples. Description of the above embodiments is merely used to facilitate understanding the method and concept of the present application. It should be noted that the present application is not limited to the form disclosed herein and should not be regarded as an exclusion of other embodiments. However, the modifications and changes made by those skilled in the art do not deviate from the spirit and scope of the present application, and shall be within the protection scope of the claims attached to the present application.

The invention claimed is:

1. A display device, for displaying a first parameter that is displayed with a certain digits and a second parameter that is displayed by a progress bar, comprising digit display segments forming a shape of "日" for displaying the digits, wherein the display segments forming the progress bar comprise a part of the digit display segments and additional display segments arranged laterally or longitudinally within and/or outside the digit display segments, and the display segments forming the progress bar are arranged laterally or longitudinally, wherein the digit display segments forming the shape of "日" comprises seven display segments, and the seven display segments are a first display segment (a), a second display segment (g), and a third display segment (d), which are laterally arranged from top to bottom, and a fourth display segment (f), a fifth display segment (b), a sixth display segment (e), and a seventh display segment (c), which are longitudinally arranged, respectively, wherein the fourth display segment (f), the fifth display segment (b), the sixth display segment (e), and the seventh display segment (c) are arranged at upper left, upper right, lower left, and lower right of the second display segment (g), respectively, an eighth display segment (h, j) is arranged between the first and the second display segments (a) and (g), a ninth display segment (i, k) is arranged between the second and the third display segments (g) and (d), and the progress bars comprise the first, the eighth, the second, the ninth, and the third display segments (a), (h, j), (g), (i, k) and (d), the display device comprises two groups of the seven display segments, each group of the two groups forming the shape of "日", the two groups are arranged laterally in parallel, a first group of the two groups comprises corresponding seven display segments: a tenth display segment (a'), an eleventh display segment (g'), a twelfth display segment (d'), a thirteenth display segment (f'), a fourteenth display segment (b'), a fifteenth display segment (e') and a sixteenth display segment (c'), and a second group of the two groups comprises the first display segment (a), the second display segment (g), the third display segment (d), the fourth display segment (f), the fifth display segment (b), the sixth display segment (e) and the seventh display segment (c), a seventeenth display segment (h', j') is arranged between the tenth and the eleventh display segments (a') and (g'), an eighteenth display segment (i', k') is arranged between the eleventh and the twelfth display segments (g') and (d'), a progress bar of the first group of the two groups comprise display segments (a'), (h', j'), (g'), (i', k') and (d') of the first group, and a progress bar of the second group of the two groups comprises display segments (a), (h, j), (g), (i, k) and (d) of the second group.

2. The display device according to claim 1, wherein the first, the eighth, the second, the ninth, and the third display segments (a), (h, j), (g), (i, k), and (d) are evenly spaced apart and have a same length.

3. The display device according to claim 1, wherein the seventeenth display segment (h') is laterally arranged between the tenth and the eleventh display segments (a') and (g'), the eighteenth display segment (i') is laterally arranged between the eleventh and the twelfth display segments (g') and (d'), the eighth display segment (h) is laterally arranged between the first and the second display segments (a) and (g), and the ninth display segment (i) is laterally arranged between the second and the third display segments (g) and (d).

4. The display device according to claim 1, wherein the first and tenth display segments (a) and (a'), the eighth and seventeenth display segments (h, j) and (h', j'), the second and eleventh display segments (g) and (g'), the ninth and eighteenth display segments (i, k) and (i', k'), and the third and twelfth display segments (d) and (d') are displayed synchronously.

5. The display device according to claim 1, wherein the eighth display segment (j) and the seventeenth display segment (j') are longitudinally arranged between the display segments (f) and (b) and between the display segments (f') and (b'), respectively, and the ninth display segment (k) and the eighteenth display segment (k') are longitudinally arranged between the display segments (e) and (c) and between the display segments (e') and (c'), respectively.

6. The display device according to claim 5, wherein the display segments (f) and (e), (h, j) and (i, k), (b) and (c), (f') and (e'), (h', j') and (i', k'), (b') and (c') are displayed synchronously.

7. The display device according to claim 5, wherein the display segments (f), (h, j), and (b) are evenly spaced apart and have a same length, the display segments (e), (i, k), and (c) are evenly spaced apart and have a same length, and the display segments (f'), (h', j'), and (b') are evenly spaced apart and have a same length, and the display segments (e'), (i', k'), and (c') are evenly spaced apart and have a same length.

8. The display device according to claim 7, wherein an interval between the display segments (b) and (f') is the same as an interval between the display segments (h, j) and (g, b), and an interval between the display segments (c) and (e') is the same as an interval between the display segments (i, k) and (d, c).

9. The display device according to claim 8, wherein the display segments (f) and (e), (h, j) and (i, k), (b) and (c), (f') and (e'), (h', j') and (i', k'), (b') and (c') are displayed synchronously.

10. A shower control device, comprising the display device according to claim 1, wherein the first parameter is a water temperature, and the second parameter is a flow rate.

11. The shower control device according to claim 10, further comprising a control panel, a shower panel, a switch key for controlling the display device to selectively display the water temperature or the flow rate, and an adjustment assembly for controlling the water temperature and the flow rate, the switch key and the adjustment assembly are arranged in the shower panel, and the switch key, the adjustment assembly and the display device are electrically connected to the control panel, respectively.

12. The shower control device according to claim 10, wherein the digit display segments and the additional display segment are nixie tubes.

13. The shower control device according to claim 11, wherein the adjusting assembly is a rotary knob, and the display device is arranged inside the rotary knob and is configured to display the water temperature or the flow rate on a front surface of the rotary knob, and the rotary knob is rotated to adjust the water temperature or the flow rate.

14. The shower control device according to claim 11, wherein the digit display segments and the additional display segment are nixie tubes.

15. The shower control device according to claim 13, wherein the digit display segments and the additional display segment are nixie tubes.

16. A rotary knob, comprising the display device according to claim 1, wherein the display device is arranged inside the rotary knob and is configured to display the first parameter and the second parameter on a front surface of the rotary knob.

* * * * *